July 4, 1972  P. F. HEILMAYER ET AL  3,674,388
MANUFACTURE OF PLASTIC SIDING
Filed Jan. 14, 1970  2 Sheets-Sheet 1
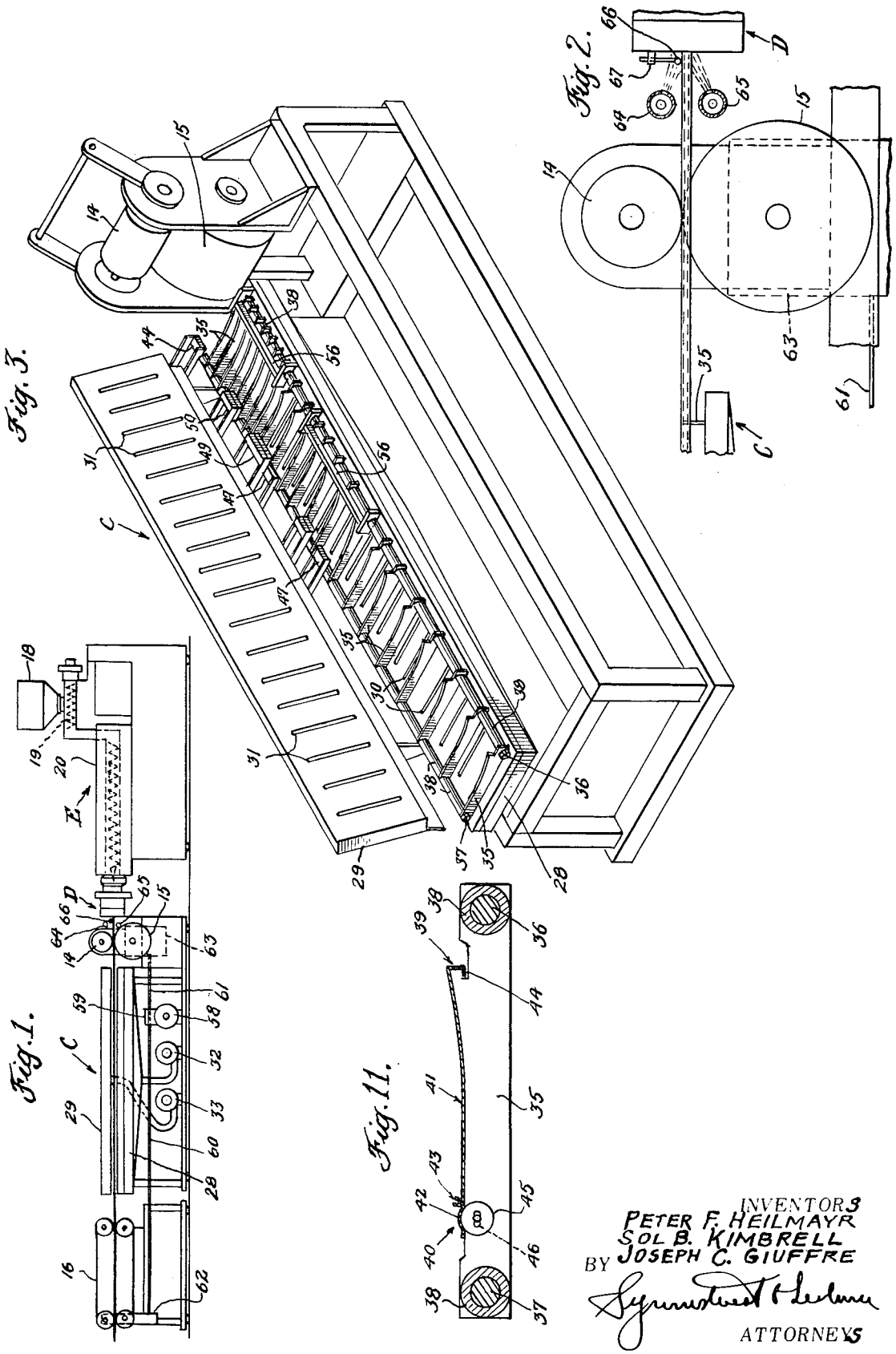

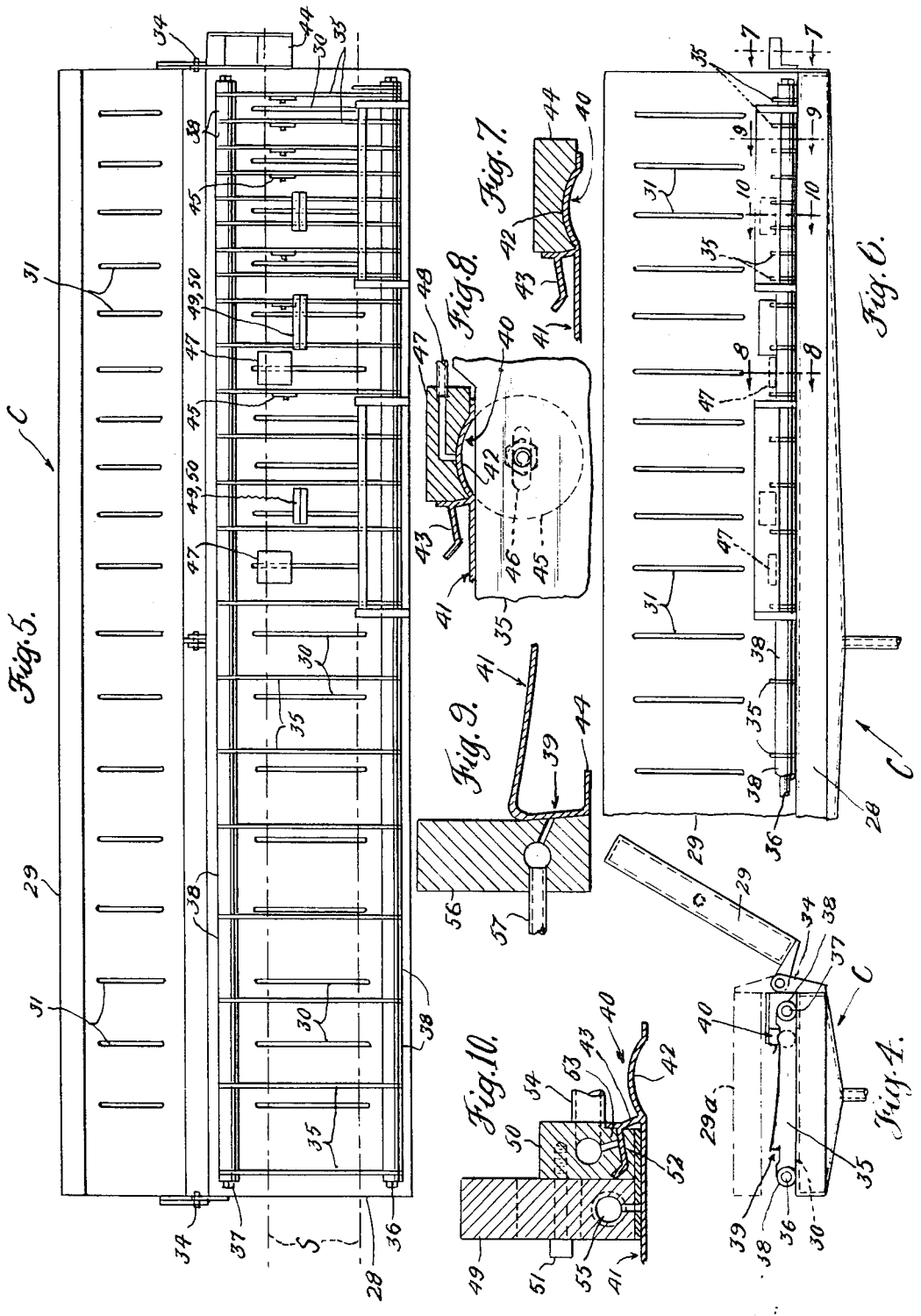

United States Patent Office 3,674,388
Patented July 4, 1972

3,674,388
MANUFACTURE OF PLASTIC SIDING
Peter F. Heilmayr, Sol B. Kimbrell, and Joseph C. Giuffre, McPherson, Kans., assignors to Certain-Teed Products Corporation, Ardmore, Pa.
Filed Jan. 14, 1970, Ser. No. 2,723
Int. Cl. B29f 3/00
U.S. Cl. 425—72
4 Claims

ABSTRACT OF THE DISCLOSURE

Plasticated polyvinyl resin material is extruded in a shape approximating the cross sectional shape of the siding and equipment is provided for air sizing and air cooling the extruded shape, so as to accurately dimension the siding as it is being hardened.

BACKGROUND AND STATEMENT OF OBJECTS

It is known to produce siding from thermoplastic resin materials and for this purpose extrusion techniques have been employed in accordance with which the resin material in plasticated form is extruded through a die orifice generally conforming with the cross sectional shape of the siding, after which the extruded siding is cooled to harden it. Thereafter appropriate lengths are cut from the hardened extrusion and various machining operations are applied. In operations of the kind above referred to, it is also known to utilize polyvinyl chloride resin materials, usually formulated with pigment and other constituents to impart special properties to the product.

The present invention is concerned primarily with equipment and techniques to be used in the cooling and sizing of the siding after it is extruded. Cooling and sizing techniques are known, and most of the prior systems involve the use of metallic surfaces which serve both for sizing and for cooling. In contrast, according to the present invention the cooling and sizing is effected primarily by the use of air. This is of advantage, as contrasted with the use of metallic surfaces for these purposes because the air sizing and air cooling provides an improved surface texture as compared with the metallic surfaces, notably a texture which has much lower light reflection or gloss.

By the use of air cooling and air sizing it is also possible to introduce an embossing step between the extruder and the sizing and cooling equipment, such embossing being desirable for the purpose of imparting a grain or similar texture effect at the surface. The use of metallic surfaces subsequent to an embossing or graining operation is not practicable, because the metallic surfaces will "erase," so to speak, the graining effect, or will at least result in serious impairment of the desired graining effect.

Although a sizing or shaping operation presents some difficulties from the standpoint of achieving accuracy and uniformity of the product, the invention includes equipment and devices of special form which are capable of effecting accurate sizing and which thus achieve the benefits of the improved surface texture which is only obtainable by the use of air cooling and sizing.

How the foregoing and other objects and advantages are attained will appear more fully from the following description referring to the accompanying drawings, in which:

BRIEF DESCRIPTION OF DRAWINGS

FIG. 1 is a somewhat diagrammatic elevational view of portions of a siding production line arranged according to the present invention;

FIG. 2 is an enlarged somewhat diagrammatic elevational view of certain devices located adjacent to the discharge end of the extrusion die;

FIG. 3 is an isometric view of the air cooling and sizing equipment employed in the production line diagrammatically illustrated in FIG. 1;

FIG. 4 is a view looking at the entrance end of the equipment provided for sizing and cooling of the extruded siding, this view being on an enlarged scale as compared with FIG. 1;

FIG. 5 is a plan view of the sizing and cooling apparatus, with a portion of this equipment displaced to disclose interior parts;

FIG. 6 is a fragmentary front elevational view of a portion of the equipment shown in FIG. 5;

FIGS. 7, 8, 9 and 10 are fragmentary views on a further enlarged scale illustrating certain devices employed in the sizing and cooling equipment, these views being respectively taken as indicated by the section lines 7—7, 8—8, 9—9 and 10—10 on FIG. 6; and FIG. 11 is a transverse sectional view through one of the templates for shaping the siding and illustrating the sectional shape of the siding as supported by that template, this view being enlarged as compared with FIGS. 3 to 6.

GENERAL ARRANGEMENT

The general arrangement of the equipment is illustrated in FIG. 1 in which several general sections or stations are shown, as follows.

First, an extruder mechanism indicated at E is shown at the right hand end of the production line. This extruder is adapted to receive powder polyvinyl chloride resin composition and to heat and plasticate the resin material and then deliver it into and through an extrusion die which is indicated at D.

The extrusion die is formed with a discharge orifice of cross sectional shape generally conforming with the cross section of the siding being made, for instance the shape illustrated in FIG. 11.

After delivery of the siding from the discharge orifice of the die the siding in still soft or plasticated condition is passed through the nip formed between a pair of rolls 14 and 15 (also shown in FIG. 2) one of which (14) is etched so as to emboss the siding and thereby impart a grain texture to the face side of the siding. After leaving the embosser, the siding passes into and through the equipment generally indicated at C which is provided for cooling and sizing the siding, thereby hardening the siding in the desired cross sectional shape and form. The siding is advanced through this cooling and sizing equipment by means of the puller mechanism indicated at 16.

The puller mechanism may serve to deliver the hardened siding to a station (not shown) at which pieces of the siding are cut off at the desired length.

EXTRUDER AND EXTRUSION DIE

Although from the standpoint of the present invention, the extruder and extrusion die may comprise any of a variety of known types of extrusion equipment, an extruder of the multiple screw type is particularly effective. The extruder is adapted to be fed with the resin material in powder form, by delivery of such resin material into the hopper indicated at 18, from which it is delivered by the feed screw 19 into the barrel 20 surrounding the screws of the extruder. Provision is made for careful regulation of the temperature of the extruder, for which purpose the extruder is advantageously divided into several temperature control zones, as is known with equipment of this type.

The specific form of extrusion die employed is not a part of the present invention per se, but it is pointed out that this die should have a discharge opening generally conforming with the cross sectional shape of the siding being made, the siding in the illustrative example in the drawings being of 8" width and having a butt edge 39, a hanger edge 40, and an intervening panel 41 (see FIG. 11).

It should also be understood that the discharge orifice will not necessarily exactly correspond in size and shape to the siding to be made. Indeed, in order to compensate for swelling and shrinkage factors which are present in all extrusion operations, it is preferred to utilize dimensions in the discharge orifice which are somewhat different from corresponding dimensions of the siding being made. For example, the width of the die passage is desirably increased about 5 to 15% as compared with the width of the siding, and the thickness of the passage is desirably reduced by approximately 50%, as compared with the thickness of the siding being produced.

EMBOSSING, COOLING AND SIZING

After leaving the extrusion orifice of the die, the siding enters the nip between rolls 14 and 15 which constitute an embossing mechanism for imparting to the face surface of the siding a wood grain texture effect. In the embodiment illustrated the siding is extruded generally horizontally, with the face side presented upwardly, and the roll 14 is etched or otherwise configured to the desired grain texture in order to provide the grain texture effect upon the siding. Roll 15 is desirably rubber faced so as to provide a resilient backing for maintaining the siding in contact with the embossing roll 14. Rolls 14 and 15 are preferably of a length less than the wdth of the siding so that these rolls do not deform the butt and hanger edge portions of the siding but engage only the panel intervening between the butt and hanger edges. The embossing rolls are driven in a manner which is explained below in connection with the drive system provided for the puller mechanism 16.

After leaving the embossing rolls the siding enters the cooling and sizing mechanism indicated in FIG. 1 at C and shown in greater detail in FIGS. 4 to 10 inclusive. A base 28 and a lid 29 are formed as plenum chambers, the base having a series of spaced slots 30 and the lid a similar series of slots 31 which serve to deliver air from the plenum chambers onto the upper and lower surfaces of the siding. The plenum chamber of the base 28 is supplied with air by the blower 32, and the blower 33 serves to supply air to the plenum chamber in the lid 29. The lid 29 is pivotally connected to the base by hinges 34 so that the lid may be opened (see particularly FIG. 4) in order to provide access to the feed path of the siding through this part of the mechanism. When in closed position, the lid is positioned as indicated by the dot and dash lines 29a in FIG. 4. It will be understood that a flexible tube is included in the connection between the blower 33 and the lid 29 so as not to interfere with the opening and closing movement of the lid.

A series of templates 35 are mounted upon the upper surface of the base 28, these templates being extended transversely of the siding which is indicated by the dash lines S in FIG. 5. Toward the upstream end of the cooling and sizing mechanism (the righthand end as seen in FIGS. 5 and 6) the templates are positioned relatively close to each other, but the spacing increases toward the downstream end of this mechanism. The closer spacing at the upstream end is provided in order to ensure maintenance of the relatively soft siding in the desired cross sectional contour, but as the siding moves downstream, it is progressively cooled and progressively hardened by the air delivered to the upper and lower surfaces from the plenum chambers, and for this reason the templates need not be as close together in the downstream portion of this equipment. The templates are mounted by means of supporting rods 36 and 37 which pass through apertures in the ends of the templates and on which spacing sleeves 38 are threaded.

The templates have upper edges which are contoured to conform to the desired cross sectional shape of the panel of the siding intervening between the lower or butt edge and the upper or hanger edge thereof. This edge contour clearly appears in FIG. 4 and it will be seen that it conforms in general to the cross sectional contour of the siding as it appears in FIG. 11. As above noted, the butt edge is indicated at 39 and the hanger edge is indicated at 40, the intervening panel 41 being at least in part curved.

The details of the shape of the butt and hanger edges appears to best advantage in FIGS. 7 to 10. Here it will be seen that the hanger edge includes a curved portion 42 which is convex on the front or face side of the siding and concave on the reverse side, which latter is the side applied to the wall when the siding is installed.

The hanger edge also includes a projecting portion 43 providing a recess for receiving the upturned flange or lip 44 provided on the butt edge of the siding.

Sizing and shaping devices are incorporated in the cooling and sizing mechanism for ensuring accurate formation of various of the above described parts of the butt and hanger edges of the siding. These devices include the following:

As seen in FIG. 7, a block 44 is positioned at the entrance end of the cooling and sizing mechanism and has a concavely curved surface adapted to size the curved nailing strip 42. One end of this block is also shaped to assist in properly sizing and shaping a portion of the projecting lip 43. The concave side of the curved nailing strip 42 is also adapted to be sized by the edges of a series of washers 45 which are mounted on several of the templates 35, preferably with freedom for adjustment movement transversely of the siding. The washers are provided with a slot 46 for this purpose as shown in FIG. 8. One or more sizing blocks 47 are arranged downstream of the block 44 and are provided with concavely curved surfaces for cooperation with the convexly curved surface of the nailing strip 42. These additional blocks also advantageously are provided with ports 48 for delivery of air to the surface of the nailing strip to promote the cooling and hardening thereof in the desired curved shape.

The lip 43 of the hanger edge is also sized by means of block elements engaging the lip, in the manner shown in FIG. 10. Here a pair of blocks 49 and 50 are interconnected by bolts 51 and carry sizing elements 52–53 for cooperation with the inside surface and the outside surface, respectively, of the hanger lip 43 in order to ensure hardening of that lip in the desired shape. Hardening is again promoted by the use of air ports 54 delivering air directly to the surface of the hanger lip 43. Similar ports 55 deliver air to the face side of the panel 41 in the region adjacent to the hanger edge, as is clearly shown in FIG. 10.

FIG. 9 illustrates a sizing or shaping element 56 cooperating with the lower face of the butt edge 39 of the siding. The sizing surface is here again provided with air ports indicated at 57 for promoting the hardening of this portion of the siding.

All of the air ports shown in the sizing elements in FIGS. 8, 9 and 10 are desirably supplied with air under some appreciable pressure so as to distribute the air over the surfaces being sized and thereby assure hardening of those surfaces in the desired contour. The air supplied to the plenum chambers in the base and lid 28 and 29 is advantageously at relatively low pressure as compared with the air supplied through the portage in the sizing blocks, but the air supplied through the plenum chambers is more widely distributed through slots 30 and 31 of greater cross sectional area, so that the surface of the panel intervening between the butt and hanger edges are "flooded," so to speak, with cooling air.

Because of the arrangement of the production line to extrude in a generally horizontal direction, with the face side of the siding presented upwardly, it is effective to position the templates 35 so that they overlie the back side of the siding and so that the action of gravity acting upon the relatively soft or plasticated resin material serves to maintain the siding in contact with the upper edges of the templates and thus in the desired cross sectional configuration.

Although metal surfaces of some of the butt and hanger edge shaping elements actually contact the plastic material, it will be noted that these areas of contact for the most part are areas which are not exposed to direct view when the sliding is installed. Therefore, any tendency which these surfaces might have to increase light reflection is not of special concern. In addition, it should be kept in mind that air under substantial pressure is delivered through ports formed in such surfaces and because of this, the tendency for those surfaces to polish or increase the gloss of the butt and hanger edges of the siding is not as great as in equipment in which the sizing surfaces are completely imperforate.

The puller mechanism, for instance in the form of caterpillar treads as diagrammatically indicated engages the hardened siding as it leaves the cooling and sizing mechanism and, as above noted may deliver the hardened siding to cut off means or to equipment for performing other operations on the siding. The drive for the puller mechanism 16 and the drive of the embossing mechanism 14–15 is desirably synchronized, and for this purpose a source of power indicated diagrammatically at 58 is provided. This power source may advantageously take the form of a hydraulic wobble plate pump having a proportionate flow divider valve 59 for adjustably proportioning the flow through the connections 60 and 61 which are extended respectively to the drive unit and gear box 62 for the puller mechanism 16 and the drive unit and gear box 63 for the embossing mechanism. The drive to the embossing mechanism preferably effects drive of only the rubber roll 15, the embossing roll 14 being driven as a result of engagement with the siding. This drive system provides for synchronization of the drive of the embosser and the drive of the puller mechanism, which is of importance in order to ensure that the desired grain texture is imparted to the siding by the embosser.

In connection with the arrangements provided for cooling and sizing the extruded shape, attention is further directed to certain devices shown in FIG. 2. Air distributing ducts 64 and 65 are positioned above and below the siding as it leaves the lips 25 of the die, these ducts being provided with portage for directing air against the die lips and also against the surface of the siding emerging from the extrusion orifice. The cooling action of these ducts 64 and 65 upon the lips of the die aids in maintaining a relatively low temperature at the exit face of the die and this is one of the factors contributing to the production of siding having low light reflection. Another feature illustrated in FIG. 2 is the provision of a bar 66 adjustably mounted by means of a bracket 67, this bar being of length sufficient to engage at least most of the width of the panel of the siding lying between the butt and hanger edges. This bar is adjusted to apply a slight frictional drag to the face surface of the siding and this serves to prevent longitudinal rippling or corrugation of the siding as it is extruded. Such rippling has sometimes been troublesome to overcome but is effectively eliminated by applying slight frictional drag in the manner just described.

With regard to the arrangement shown in FIG. 2, it is also to be noted that the spacing between the lips of the die, the embossing rolls and the first template 35 of the sizing mechanism is such that all of these parts are brought close together. In a production line for producing an 8" siding of the kind shown in FIG. 11, this spacing is desirably such that the nip of the embossing rolls is less than about 12", for instance 11" from the lips of the die, and further such that the first template 35 is not more than about 20" from the embossing nip, for instance about 14 or 15". This close coupling ensures that the resin of the siding will still retain sufficient plasticity or softness to permit proper embossing and also to permit gravity to properly shape the siding over the templates.

OPERATION

In considering the production of siding according to the present invention it is first pointed out that although a variety of resin materials may be utilized, it is preferred to employ compositions of which the chief resin constituent is a polyvinyl chloride resin, most advantageously a polyvinyl chloride resin with an inherent viscosity value between .90 and 1.10.

The selected resin composition is introduced into the feed hopper 18 of the extruder and is heated and plasticated by the extruder, and ultimately delivered thereby through the die D and out of the die orifice while still in its initial plasticated condition. The orifice of the die preferably is shaped to provide the general contours of the butt and hanger edges, but the panel 41 as it is extruded may initially be flat and have its curvature developed only in the cooling and sizing equipment. This initial flat panel is engaged by the friction drag bar 66 (see FIG. 2), and while the product is being extruded the die lips and also the upper and lower surfaces of the siding are somewhat cooled by the action of the air distributing ducts 64 and 65. However, before any hardening or solidification of the resin in depth occurs, the flat panel of the siding is fed into the nip between the embossing rolls 14 and 15, and the texture effect is therefore imparted to the resin prior to hardening in depth.

The siding then passes while still in soft or plasticated condition into the sizing and cooling section of the equipment and from FIG. 2 it will be noted that the first of the sizing templates 35 is located quite close to the embossing rolls, in view of which the action of gravity will properly shape the panel of the siding to the desired curvature. The siding then continues through all of the various sizing and cooling devices described above with particular reference to FIGS. 4 to 10.

The sequence of operations just referred to and the manner in which they are performed is of great importance in the production of siding which is not only accurately formed but which also has an exceptionally desirable combination of characteristics both from the standpoint of physical characteristics and appearance of the product. First the imposition of the drag by the bar 66 substantially eliminates ripple tendencies. The use of devices (64 and 65) for air cooling the lips of the die, and also the use of air cooling in the sizing and cooling section is of great importance in minimizing surface gloss, so that the siding produced has low light reflection. It will be observed that almost the entire exposed or face area of the panel intervening between the butt and hanger edges is cooled by means of cooling air only, and without the use of metal cooling surfaces in contact with the product, which latter have a tendency to exaggerate the gloss and therefore the light reflection of the resin surface.

The arrangement of the sizing templates 35 and of various other sizing devices, and the provision of the air cooling system, including the plenum chambers formed in the base 28 and the lid 29 cooperate in providing a sizing and cooling system making practical the use of air sizing while at the same time providing for a high degree of accuracy and uniformity of the product.

We claim:

1. Apparatus for making thermoplasic resin siding having hanger and butt edges with an intervening siding panel, comprising an extruder for plasticating the resin and having an extrusion die with a discharge orifice of cross sectional shape generally conforming with the cross section of the siding being made including the siding panel and the hanger and butt edges thereof, the extrusion die being positioned to deliver and feed the extruded siding generally horizontally with the mean plane of the siding lying in a generally horizontal plane, mechanism for sizing the siding including a series of templates positioned below the siding with their edges presented upwardly so that gravity maintains the siding in engagement with the templates, the templates being spaced horizontally from each other along the path of feed and each template being extended transversely of the siding, means for cooling and solidifying the siding while it is in engagement with the series of spaced templates, the cooling means including means for directing air downwardly against the top surface of the siding and means for directing air upwardly against the bottom surface of the siding in the spaces between the templates, and separate means for cooling at least one of the butt or hanger edges of the siding.

2. Apparatus as defined in claim 1 in which the means for directing air against at least one surface of the siding comprises a plenum chamber having a series of spaced openings for direction air against the siding.

3. Apparatus as defined in claim 1 in which the extrusion die delivers the panel of the siding in planar shape and in which the edges of the templates in engagement with the siding are curved to impart curvature to the siding panel.

4. Apparatus for making thermoplastic resin siding having hanger and butt edges with an intervening siding panel, comprising an extruder for plasticating the resin and having an extrusion die with a discharge orifice of cross sectional shape generally conforming with the cross section of the siding being made including the siding panel and the hanger and butt edges thereof, the extrusion die being positioned to deliver and feed the extruded siding generally horizontally with the mean plane of the siding lying in a generally horizontal plane, mechanism for sizing the siding including a series of templates positioned below the siding with their edges presented upwardly so that gravity maintains the siding in engagement with the templates, the templates being spaced horizontally from each other along the path of feed and each template being extended transversely of the siding, and means for cooling and solidifying the siding while it is in engagement with the series of spaced templates, the cooling means including means for directing air downwardly against the panel intervening between the hangar and butt edges, and the cooling means further including a sizing block positioned to engage a surface of one of said hanger and butt edges and having an air passage therein with a port delivering air against said edge surface.

References Cited
UNITED STATES PATENTS 2,294,555    9/1942    Hendrie _____ 18—12 TF UX
3,538,210    11/1970    Gatto _____ 18—14 A X J. SPENCER OVERHOLSER, Primary Examiner N. E. LEHRER, Assistant Examiner U.S. Cl. X.R.
425—328, 377, 385